UNITED STATES PATENT OFFICE.

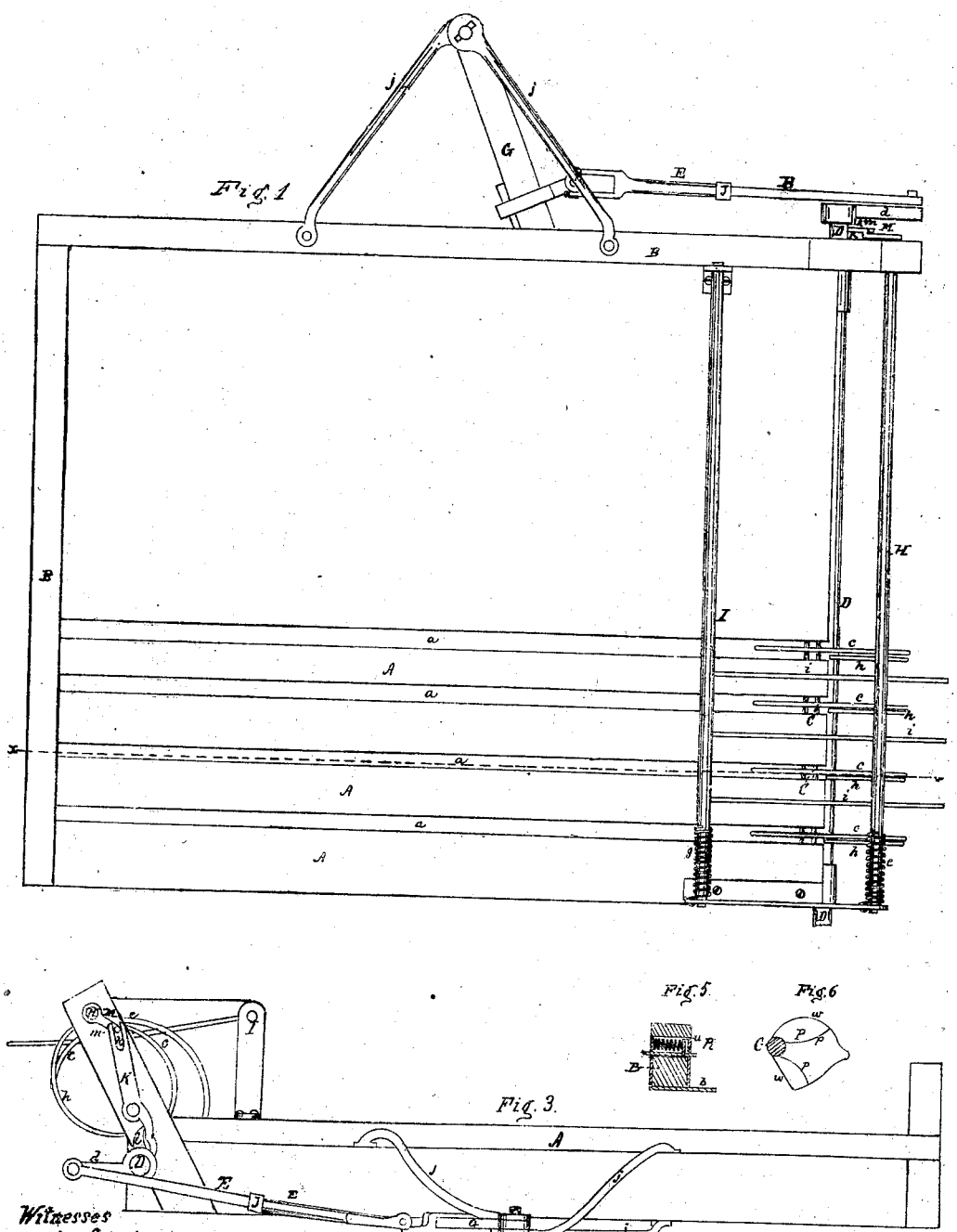

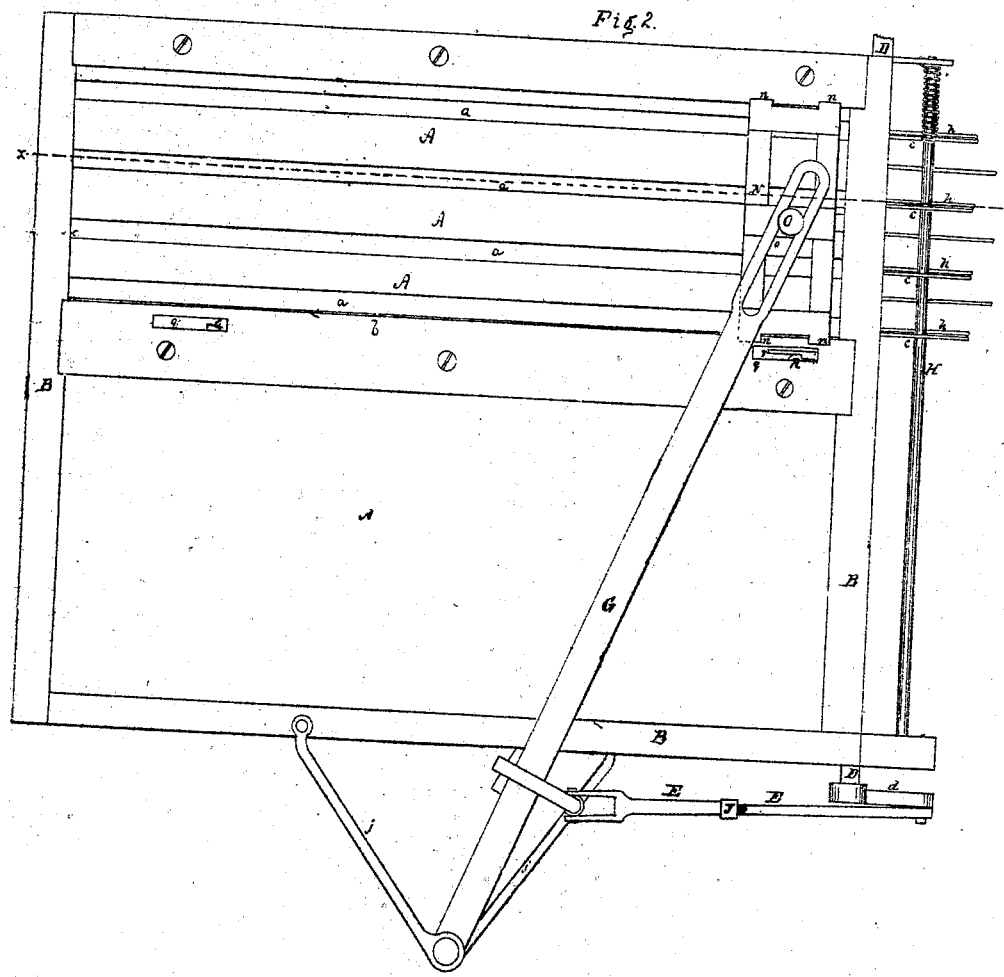
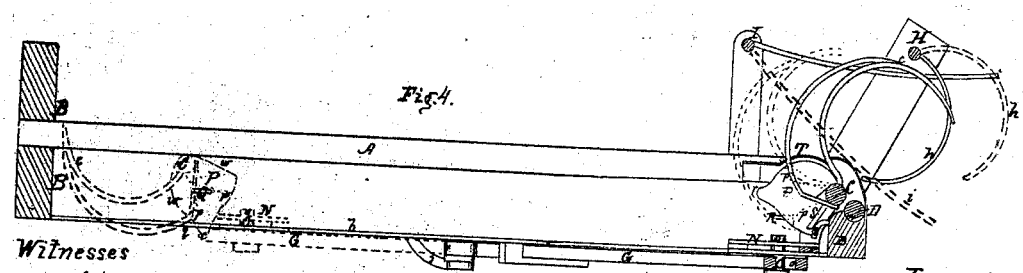

A. B. SMITH, OF CLINTON, PENNSYLVANIA.

IMPROVEMENT IN RAKING ATTACHMENTS TO HARVESTERS.

Specification forming part of Letters Patent No. 32,317, dated May 14, 1861.

*To all whom it may concern:*

Be it known that I, A. B. SMITH, of Clinton, in the county of Allegheny and State of Pennsylvania, have invented a new and Improved Automatic Raking Apparatus for Reaping-Machines; and I do hereby declare that the following is a full and exact description thereof, reference being had to the accompanying drawings, making part of this specification—

Figure 1 being a plan of the platform of a reaping-machine, together with my improved raking apparatus; Fig. 2, a plan of the under side thereof; Fig. 3, a rear elevation of the same; Fig. 4, a vertical section thereof in the plane indicated by the line $x\ x$, Figs. 1 and 2; Figs. 5 and 6, views of parts detached.

Like letters designate corresponding parts in all the figures.

The platform A may be of ordinary construction for the use of a rake traveling transversely across it, and it is secured in any suitable frame-work, B.

A driving-shaft, D, suitably connected with the machine, serves to actuate all the parts of the apparatus. First, by means of a crank, $d$, and connecting-rod E, it communicates the proper vibrating movement to an oscillating arm, G, for moving the rake-carriage N forward and backward beneath the platform. The connection between the arm G and carriage N may be by the pivot O on the carriage and slot $o$ in the arm, as shown, or by any equivalent means. The carriage has suitable bearings, $n\ n$, for sliding over the ways $b\ b$. In the drawings, these ways $b\ b$ are represented as plates or ledges projecting inward toward each other. Instead of these plates, parallel rods may be used for the ways, in which case, however, there should be a projecting plate corresponding in position with one (generally the more central) of the plates $b\ b$, for purposes hereinafter specified.

The usual slots or narrow spaces, $a\ a$, are made transversely through the platform for the rake-teeth to move in.

In order to adjust the length of the stroke given to the driving-arm G, the connecting-rod E is divided into two parts, as shown, the one screwing into a socket of the other, so that the whole rod may be lengthened or shortened as much as required. A nut, J, is employed to secure the parts fast at any length.

The portion of the platform containing the rake and the working parts connected with it are covered underneath by a sheathing of sheet-iron, or its equivalent, to protect them from disarrangement and injury.

The rake-head C is freely pivoted in the carriage N, so that the rake-teeth $c\ c$ may be turned back beneath the surface of the platform (as shown by red lines in Fig. 4) during the backward movement of the rake, or be raised into an erect position for raking up the grain during the forward movement of the rake. The usual movements of the rake-head on its pivots are effected by means of a cam-plate or dog, P, in connection with other parts, as follows: This cam or dog is firmly secured to the rake-head C, so that its positions regulate the positions of the rake-teeth $c\ c$. It has at the greatest distance from its axis a heel, $r$, which, by resting and sliding on the proper plate or way $b$, Fig. 4, holds the rake-teeth down as the carriage N recedes, and holds the rake-teeth up as the carriage N advances. In order to turn the rake-teeth up or down, the cam P has to be turned, say, one-fourth of a circle, around its axis, and this is accomplished by means of a recess in the back of the cam, having abrupt outlines $p\ p$, as represented by dotted lines in Fig. 4, but more distinctly in Fig. 6, the rest of the surface of the cam sloping off nearly to a thin edge either way, as at $w\ w$ in the same figures, and by means of two detents, Q R, secured in the adjacent side of the frame, respectively, in the positions where the rake is to be turned up and down. These detents are inclined inward toward the approaching rake, and are abrupt on the opposite edges, as shown in Fig. 2, and they are projected forward from the frame by springs, so that as the cam P strikes their inclined surfaces they may be allowed to yield and retreat to let the cam pass.

In Fig. 5 is shown a coiled spring, $t$, acting against a stud, $u$, on the detent R, and a similar arrangement is employed for the detent Q, or any equivalent device, for both. Then, just before the rake arrives at the termination of its movement the detent springs into the recess of the cam P, behind one abrupt edge, $p$, and when the rake begins to return in the other direction holds against the said edge, and thus turns the cam round sufficiently to bring the rake-teeth up or down, as the case may be, the action being precisely the same in both cases. In order to allow the heel $r$ of the cam to pass the ledge or plate $b$, a recess or slot, $q$, is made therein at each end, as shown in Fig. 2 and indicated in Fig. 4 in connection with the position of the cam P at the moment of turning, (indicated by red lines.) This ledge or plate $b$, if distinct from the way of the rake-carriage N, may terminate at $q$ $q$ at each end, and thus arrive at the same result. By the time that the cam becomes freed from the detents Q R its heel again rests upon the ledge or plate $b$, and thus holds the rake in position during the remainder of the movements.

The movements of the rake, produced as above, correspond with the usual or necessary movements. I also give an additional turn thereto just at the close of its forward movement—say from the position shown by dotted lines in Fig. 4 to the position shown by black lines in that and the other figures. This additional turn of the rake is very conveniently effected by means of a stud or arm, S, Fig. 4, which projects from the rake-head C, striking a stop, $s$, on the frame B just in time to produce the required extent of movement of the rake before the forward motion thereof ceases. In order to prevent carrying this last movement of the rake beyond what is necessary, and too far to allow the detent R to bring it back to the previous position, I employ an elastic or slotted plate, T, situated and shaped substantially as shown in Fig. 4, so that it will be struck by the heel $r$ or upper edge of the cam at the proper time, and thus assist in bringing down the same as the receding movement of the rake begins. Any equivalent of this elastic or slotted plate may be employed instead of it. The use of this last turn or movement of the rake will be shown in connection with the mechanism for the final gathering and casting off of the gavels or bunches of grain.

A rock-shaft, H, is pivoted in suitable bearings in a position outside of and above the outer edge of the platform, substantially as represented in the drawings. A set of curved teeth, $h$ $h$, project therefrom downward and forward to the casting-off edge of the platform. A torsional spring, $e$, (or its equivalent,) on the shaft H keeps the said teeth pressed forward against the platform with sufficient force to sustain the grain brought forward by the rake. The rock-shaft H, with its teeth $h$ $h$ and spring $e$, may be termed the "sheaf-guard." It serves to receive the grain or gavel brought forward each time by the rake and hold it there suspended over the edge of the platform until the moment arrives for casting the same off upon the ground. This last movement is effected very quickly, so as to leave the gavels compact on the ground, first by the final turn forward and downward of the rake-teeth $c$ $c$, effected by the arm S and stop $s$, as above specified, thus compressing the grain downward compactly on the sheaf-guard, then by the sudden raising of the sheaf-guard teeth $h$ $h$ out from under the grain into the position indicated by red lines in Fig. 4, and finally by the downward action of compressing-rods $i$ $i$, which project forward from a rock-shaft, I, substantially as shown in the drawings, and are pressed downward by a torsional spring, $g$, on said shaft I, or equivalent means, thus springing down from the position indicated by black lines in Fig. 4 to the position indicated by red lines in the same figure and casting down the grain in an instant upon the ground.

The sheaf-guard teeth $h$ $h$ are raised by a positive motion from the driving-shaft D by means of a cam, L, on said shaft acting against the lower end, $l$, of a vibrating lever, K, in the upper end of which is a notch or slot, $k$, for receiving a pin, $m$, on an arm, M, that projects from the rock-shaft H of said sheaf-guard. These parts are all arranged so as to produce the proper vibratory movement of said rock-shaft at the moment required. The compressing-arms $i$ $i$ are raised by the grain itself as it is brought forward by the rake.

What I claim as my invention, and desire to secure by Letters Patent, is—

1. The cam P, constructed, arranged, and operating in combination with the spring-detents Q R and guide-plate $b$, substantially as herein specified, for the purpose of turning the rake up and down at the termination of its backward and forward movements.

2. The combination of the arm S and stop $s$ for giving the additional forward and downward motion to the rake at the termination of its forward movement with the mechanism for operating the grain or sheaf guard, whereby the gavel is discharged in a compact form, substantially as herein described.

3. The sheaf-guard arranged and operating in combination with the rake, substantially in the manner and for the purpose specified.

4. The compressing-arms $i$ $i$, arranged and acting in combination with the rake and sheaf-gaurd, substantially as and for the purpose herein specified.

5. The combination and arrangement of the cam L, vibrating lever K, and arm M, constructed, substantially as described, for communicating the required positive motion from the driving-shaft to the sheaf-guard.

In witness whereof I have hereunto set my hand this 15th day of March, 1861.

A. B. SMITH.

Witnesses:
J. S. BROWN,
R. F. OSGOOD.